(12) United States Patent
Burton

(10) Patent No.: US 6,354,081 B1
(45) Date of Patent: Mar. 12, 2002

(54) ATTACHMENT FOR SKID STEER LOADER OR OTHER COMMERCIAL WORK VEHICLE HAVING WIRELESS HYDRAULIC SEQUENCING BLOCK

(75) Inventor: Paul Burton, Lee, IL (US)

(73) Assignee: Farmers' Factory Company, Lee, IL (US)

( * ) Notice: Subject to any disclaimer, the term of this patent is extended or adjusted under 35 U.S.C. 154(b) by 0 days.

(21) Appl. No.: 09/686,667

(22) Filed: Oct. 11, 2000

(51) Int. Cl.$^7$ ................................................ F15B 13/06
(52) U.S. Cl. .............................. 60/427; 91/318; 91/536; 15/82
(58) Field of Search .......................... 60/427, 484, 420; 91/306, 308, 318, 536; 15/82, 83, 84, 85, 86, 87, 340.3, 340.4

(56) References Cited

U.S. PATENT DOCUMENTS

| 3,833,961 | A | * | 9/1974 | Fortman et al. |  |
| 5,564,506 | A |  | 10/1996 | Foster et al. ................ | 171/63 |
| 5,630,476 | A |  | 5/1997 | Foster et al. ................ | 171/63 |
| 5,924,155 | A |  | 7/1999 | Broz .......................... | 15/83 |

* cited by examiner

Primary Examiner—Edward K. Look
Assistant Examiner—Thomas E. Lazo
(74) Attorney, Agent, or Firm—Leydig, Voit & Mayer, Ltd.

(57) ABSTRACT

A work attachment for a commercial work vehicle such as a skid steer loader has a unique hydraulic circuit that splits hydraulic working flow between two hydraulic functions without the need for electronic solenoids. The commercial work vehicle has hydraulic flow through two hydraulic hoses to the work attachment which can be reversed by the operator of the vehicle to provide two different hydraulic signals. During normal operation, hydraulic working output flow is directed toward a first function, such as the rotary motor of a rotary broom or rotary snow blower. To provide for the second function, the circuit includes a diversion valve that may take the form of a check valve that diverts the flow in response to one of the hydraulic signals (e.g. when flow is reversed). The diversion valve directs flow toward the second hydraulic function such as a hydraulic cylinder for positioning a portion of the attachment (e.g. to effect a selected engaging angle of a rotary broom). A hydraulic switch is used to direct the working output flow for both expansion and contraction of the hydraulic cylinder. The hydraulic switch automatically switches due to increased pressure when the hydraulic cylinder reaches the end of its movement such that the cylinder continuously reciprocates back and forth until the hydraulic signal is terminated and hydraulic flow is again directed to the first function.

24 Claims, 15 Drawing Sheets

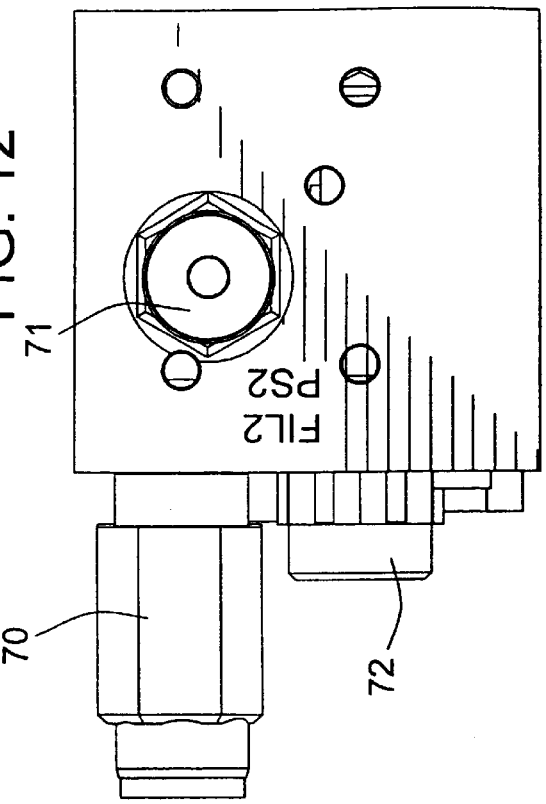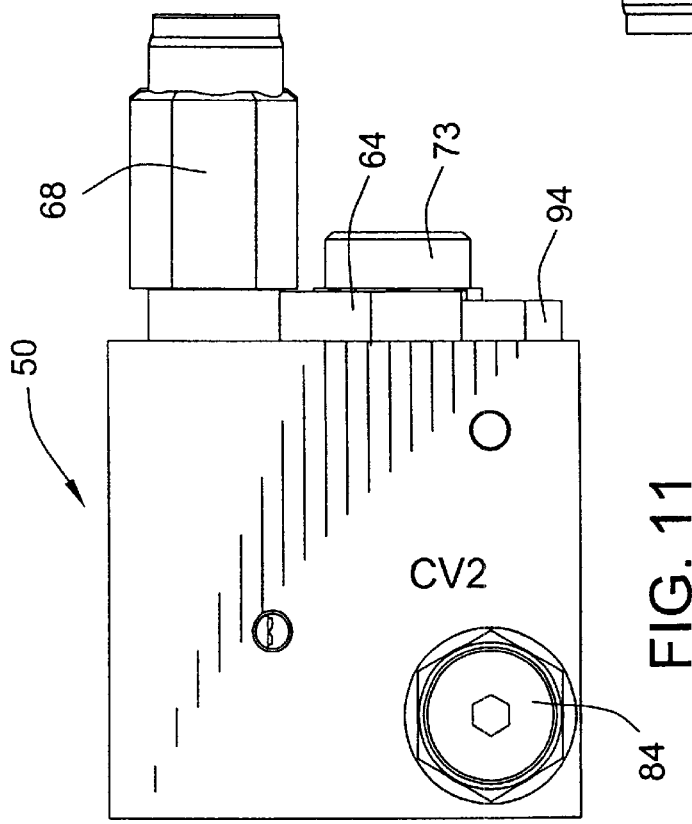

ATTACHMENT FOR SKID STEER LOADER OR OTHER COMMERCIAL WORK VEHICLE HAVING WIRELESS HYDRAULIC SEQUENCING BLOCK

FIELD OF THE INVENTION

The present invention generally relates to hydraulic controls and more specifically to the hydraulic controls for attachments to skid steers, loader tractors and other work vehicles.

BACKGROUND OF THE INVENTION

Skid steers, loader tractors and other commercial work vehicles are commonly used for many industrial, agricultural, and landscaping operations. These work vehicles typically have two laterally spaced loader arms that extend in front of the vehicle that are adapted to attach to a wide variety of attachments. Commercial work vehicles may also have a three point hitch at their back end. A number of attachments can be selectively attached and detached from the loader arms or the three point hitch to make these work vehicles applicable to a wide variety of applications. For example, a bucket is commonly provided to dig, dump and transport loose materials such as dirt, sand and gravel. The loader arms are hydraulically driven to raise and lower the attachment and pivot the attachment about a horizontal axis.

Skid steer loaders and other work vehicles commonly have a single hydraulic hook-up which comprise a pair of couplings (one for pressurized hydraulic flow and the other for rated flow) that can be utilized by the attachment for any desired purpose. A control lever is provided in the operator cab for controlling the hydraulic flow to the attachment through the hydraulic couplings. The common uses of the hydraulic pump include tilting the attachment left or right about a vertical axis to effect a windrow and/or to direct dirt, gravel or debris, or alternatively hydraulically driving an engaging device such the rotary rake of a as a rock raking attachment.

Although a single hydraulic hook up is sufficient for many of the applications, it is often insufficient for certain attachments where it is required or desirable to have hydraulic control over more than one function, such as rotary broom attachments. Rotary broom attachments often include: (1) a hydraulic cylinder for tilting the broom left or right about a vertical axis to direct swept debris or effect a windrow and (2) a hydraulically driven motor that rotates the broom to sweep material. Heretofore, the prior approach of controlling two separate hydraulic functions with a single power source has been to use an electronically operated solenoid that switches between the two functions. However, this approach has significant drawbacks. One drawback is that electrical wiring, electrical hook-ups and electrical couplings are necessary to operate the solenoid. These electrical components increase the time and difficulty of attaching and detaching attachments. Loose wires can also break or sever when not properly secured or when not properly located out of the way when not in use. Due to the environment at which attachments operate, these electrical components are also often subject to wear, poor connections and the like. In view of the foregoing, electrical hook-ups, wiring and couplings have lead to much aggravation for work vehicle operators, require frequent replacement and are not desirable.

SUMMARY OF THE INVENTION

It is an object of the present invention to eliminate or reduce the need for electrical wiring hook ups, electrical couplings, and electrical wiring on attachments for work vehicles that have more than one hydraulically powered function.

In accordance with this objective the present invention provides an attachment that has a hydraulic circuit that is responsive to hydraulic signals (e.g. as result of hydraulic flow being reversed) that selectively operates one of the hydraulic functions when one signal is received and the other hydraulic function when the other hydraulic signal is received.

According to one aspect, the present invention is directed toward an attachment for selective attachment to and detachment from a work vehicle. As is conventional, the work vehicle has a hydraulic pump for generating a working output and a hydraulic sump and the working output controlled by the operator of the work vehicle to selectively provide two different hydraulic signals. The attachment includes a mounting structure adapted to attach and detach the attachment to the work vehicle. The attachment further includes a first hydraulic actuator performing a first work operation a second hydraulic actuator performing a second work operation (thus two hydraulic functions). A hydraulic circuit connects the working output of the work vehicle with the first and second hydraulic actuators. The hydraulic circuit including a primary circuit directing the working output to the first hydraulic actuator and a secondary circuit directing the working output to the second hydraulic actuator. To control flow between hydraulic function, the hydraulic circuit further comprises a diversion valve (in the preferred form of a check valve) diverting working output through the secondary circuit in response to one of the hydraulic signals.

It is a further aspect of the present invention that the second hydraulic actuator is a hydraulic cylinder requiring flow to it to be reversed in order to have a reciprocating stroke. To switch or reverse the flow, a hydraulic switch is provided that is responsive to hydraulic pressures in the hydraulic circuit to control hydraulic flow to the hydraulic cylinder and expand or retract the cylinder as desired.

According to a preferred implementation, the hydraulic circuit comprises a pair of hoses for hydraulic coupling to the work vehicle and a hydraulic sequencing block. One of the hoses is directly connected to the first actuator in the form of a hydraulic rotary motor (that may power a rotary broom for example). The hydraulic sequencing block comprises (a) a first port hydraulically connected with the first hydraulic hose, (b) a second port hydraulically connected with the rotary motor;

(c) a pair of third and fourth ports hydraulically connected to the hydraulic cylinder for reciprocating the hydraulic cylinder;

(d) a diversion valve arranged between the first and second ports adapted to divert hydraulic working flow through a bypass conduit to one of the third and fourth ports for operating the hydraulic cylinder;

(e) a hydraulic switch arranged in the bypass conduit adapted to switch the working flow between the third and fourth ports, the hydraulic switch adapted to be responsive to increased hydraulic pressure in the working output as a result of the hydraulic cylinder reaching ends of its linear reciprocating movement; and (f) a vent conduit venting to the second port, routed through the switch to one of the third and fourth ports for venting flow from the hydraulic cylinder out through the second port.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIGS. 8–12 are top, bottom, front side, first end and second end views of the hydraulic sequencing block shown in FIG. 7.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Figure 1:
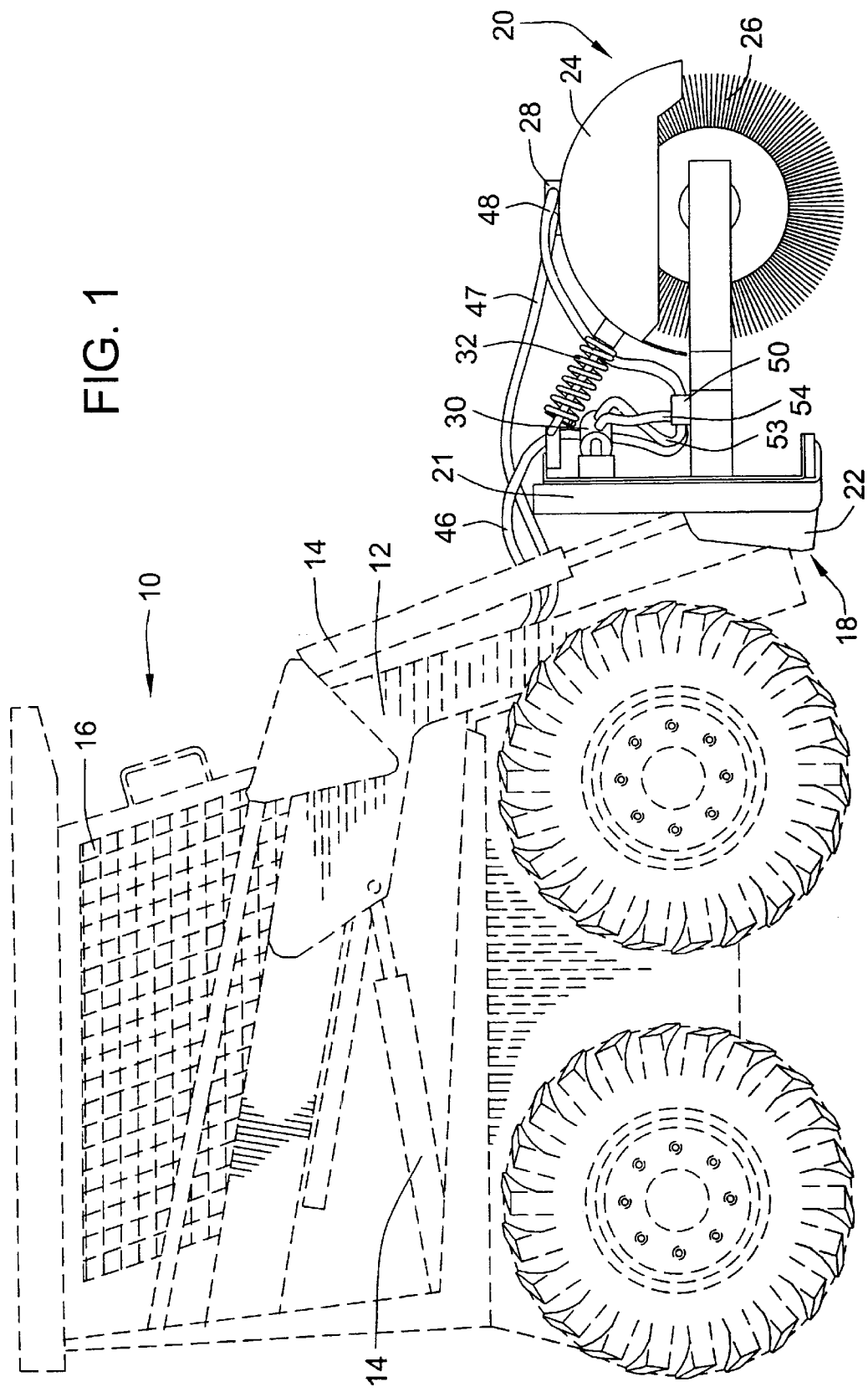
FIG. 1 is a side elevation view of a rotary broom attachment according to an embodiment of the present invention attached to an exemplary work vehicle shown in the form of a skid steer loader.

Referring to the drawings and specifically to FIG. 1, it can be seen that the present invention generally relates to the field of commercial work vehicles such as a skid steer 10 as shown, or other loader tractors, tractors or other commercial work vehicles. A skid steer loader 10 is adapted for use in many industrial, agricultural and landscaping applications wherein easy maneuverability, power lifting and transporting capabilities are required. The skid steer loader 10 is provided with a pair of laterally spaced loader arms 12 that are driven along an arcuate path by hydraulic cylinders 14. The loader arms 12 are pivotally attached to main body of the skid steer loader 10 on each side of the operator cab 16.

Toward the front end of the loader arms 22 there is provided a mounting structure which takes the form in this embodiment as a quick attach mechanism 18 as is well known in the art. The quick attach mechanism 18 allows for selective attachment and detachment of the skid steer loader 10 to a wide variety of attachments for industrial, agricultural, construction, landscaping, commercial and other applications.

Figure 2:
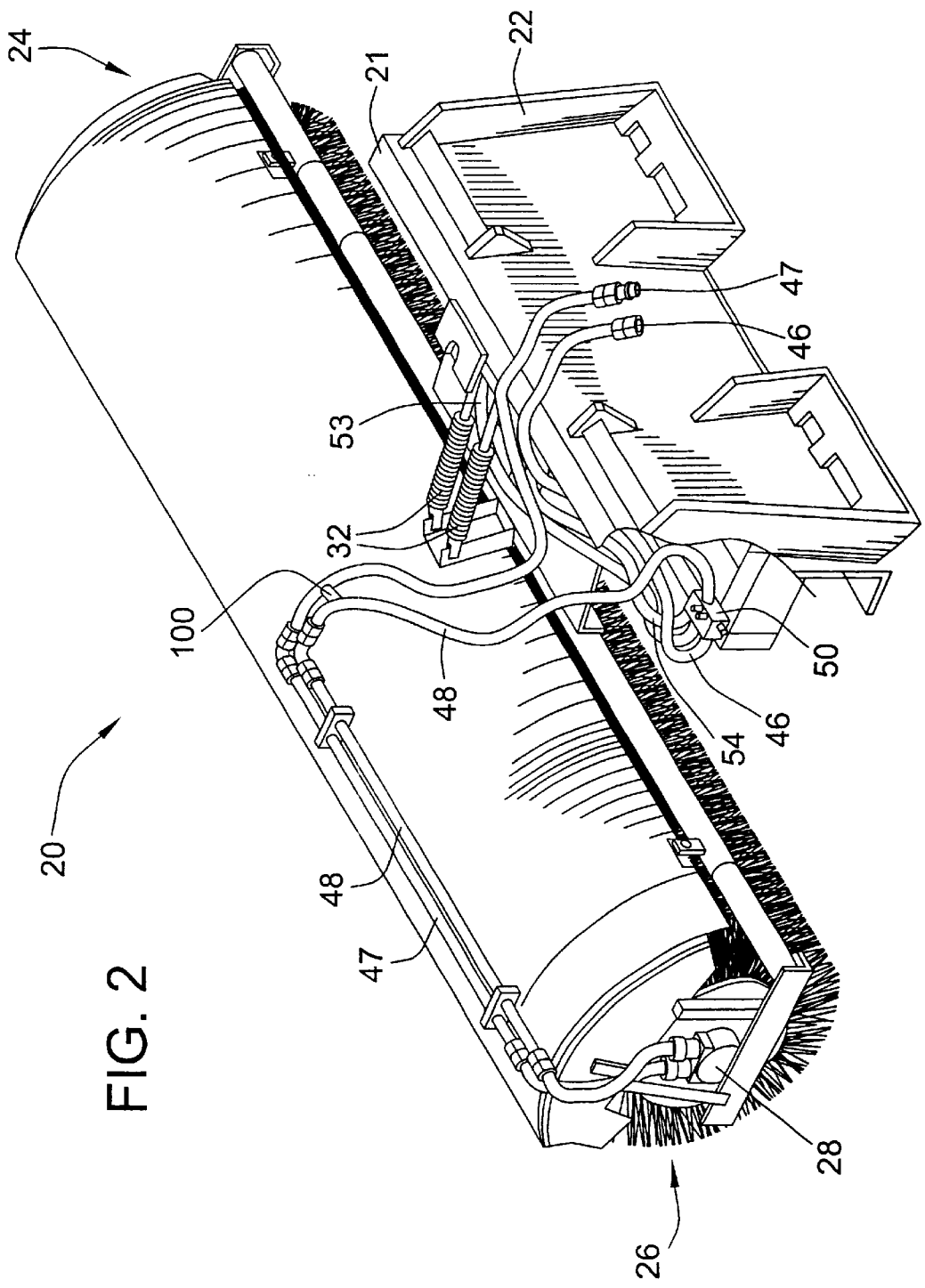
FIG. 2 is an isometric view of the rotary broom attachment shown in FIG. 1 with a portion of the attachment being cut away to expose the hydraulic block.
Figure 3:
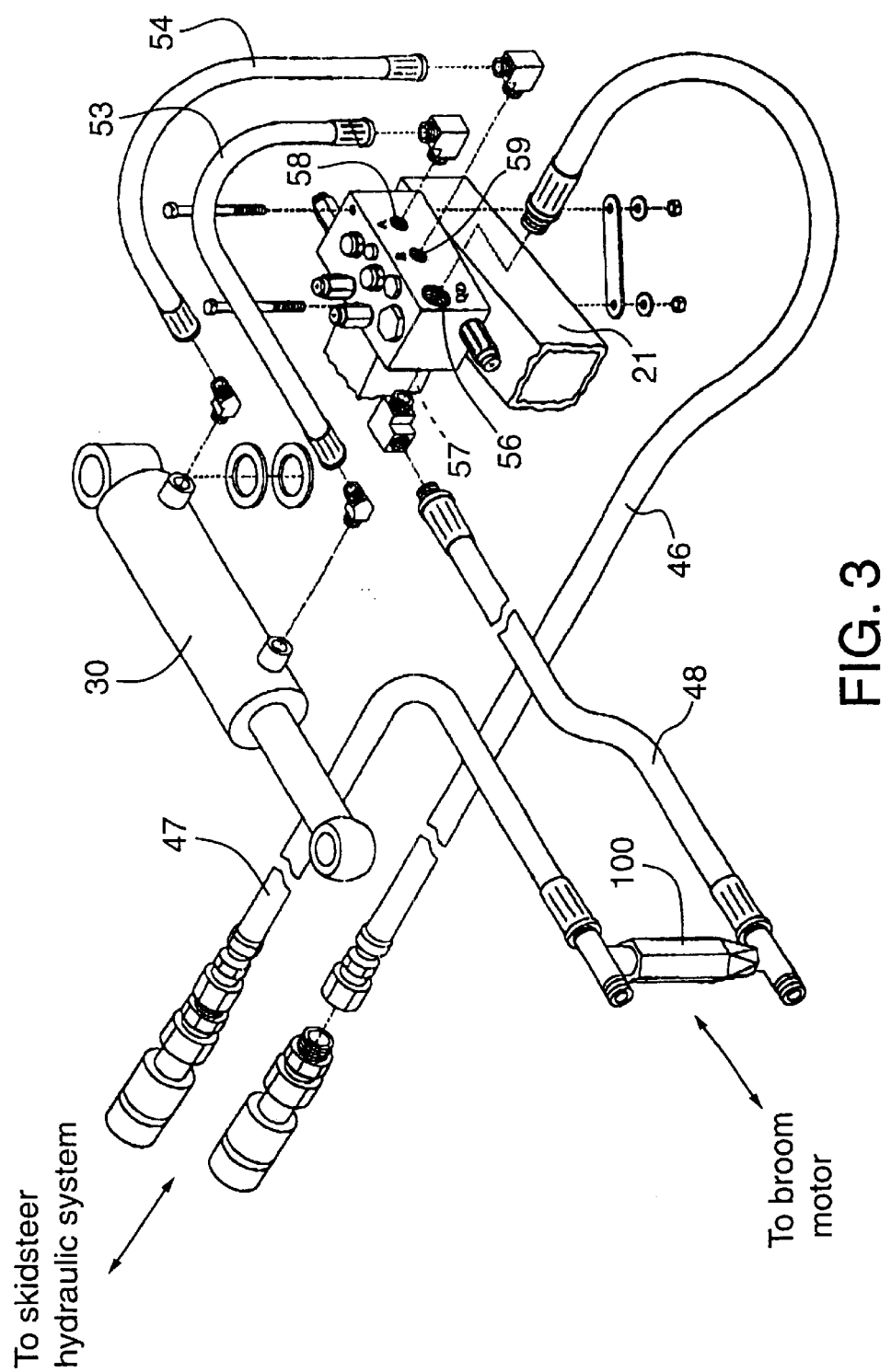
FIG. 3 is an exploded assembly drawing of a hydraulic circuit used for the rotary broom attachment shown in FIG. 2 according to an embodiment of the present invention.

The specific attachment to which the illustrated embodiment is directed is a rotary broom attachment 20 as shown in FIGS. 1–3. The rotary broom attachment 20 includes a mounting support structure 21 including quick attach plate 22, a broom support frame 24, and a rotary broom 26. The quick attach plate 22 is adapted to be quickly attached and detached from the quick attach mechanism 18 of the skid steer loader 10 in a conventional manner. The rotary broom 26 is mounted for rotation to the broom support frame 24 in a conventional manner. A first hydraulic actuator, namely a hydraulic rotary motor 28, is mounted to an end for broom support frame 24 and drives the rotary broom 26 about its axis of rotation to provide for sweeping of dirt, debris, gravel and other material. The broom support frame 24 is pivotably mounted about a vertical axis to the mounting support structure 21 such that the rotary broom 26 may be pivoted left or right to direct dirt, debris, gravel and other material being swept by the rotary broom 26. To control the tilt position of the broom 26, a second hydraulic actuator shown in the form of a hydraulic cylinder 30 is mounted between the support structure 21 and the broom support frame 24 such that expansion and contraction of the hydraulic cylinder 30 pivots the broom to the desired angle. A pair of stabilizer spring supports 32 are also connected between the support structure 21 and the broom support frame 24.

From the foregoing and referring to FIGS. 4–6e, it will be apparent that the disclosed embodiment includes two different hydraulic functions, including a tilt function and a broom rotation function. With this being said, only one hydraulic working output is typically available from the hydraulic system 33 of the skid steer loader 10, through a pair of hydraulic couplings 34 from the hydraulic system 33 having quick connect hydraulic couplings at their ends. During operation, one of the hydraulic couplings 34 carries high pressure hydraulic fluid from the skid steer's hydraulic pump 36 while the other coupling vents the return flow of low pressure hydraulic fluid to the skid steer's hydraulic sump 38. A control lever 39 is provided in the operator cab 16 that allows manual control over a 4-way, three position, blocked over center, control valve 40. Thus, there is a single control provided in the operator cab 16 for control over two hydraulic functions. The skid steer's control valve 40 has a first position shown schematically in FIG. 5 in which hydraulic flow is direct in one direction, a second position as shown schematically in FIG. 6a–6d in which hydraulic flow is in the reverse direction and a third position as shown schematically in FIG. 4 which prevents hydraulic flow to the rotary broom attachment 20.

Recalling that prior rotary broom attachments (and other similar attachments having two different hydraulic functions) have used a second additional control in the form of electrically operated solenoid to switch between the hydraulic functions, the illustrated embodiment departs from the prior art by providing a rotary broom attachment 20 with two different hydraulic functions (hydraulic rotary motor 28 and hydraulic cylinder 30) using the single hydraulic control of the skid steer loader 10 without the need for an electrically operated solenoid. The described embodiment of the rotary broom attachment 20 achieves the foregoing by featuring a hydraulic circuit 42 that is responsive to the direction of the hydraulic flow (in which flow in one direction provides a first hydraulic signal and flow in the reverse direction provides a second hydraulic signal). Details of how this is accomplished and advantages will be detailed further below after a first describing structurally how the described embodiment of the circuit 42 is arranged.

In the described embodiment, the hydraulic circuit 42 is connected to the hydraulic system 33 of the skid steer loader 10 by a pair of hoses 46, 47 that include quick attach couplings at their ends for quick hydraulic attachment and detachment from the skid steer. The first hose 46 is connected to a hydraulic sequencing block 50 while the second hose 47 is connected directly to the hydraulic motor 28. A third hose 48 connects the hydraulic motor 28 to the hydraulic sequencing block 50 as well. The first three hoses 46–48 and internal plumbing of the hydraulic sequencing block 50 complete a primary circuit (shown in bold lines and arrows in FIG. 5) for operational mode of the hydraulic rotary motor 28 as shown in the schematic illustration FIG. 5. The hydraulic circuit 42 also includes a secondary circuit (shown in bold lines and arrows in FIG. 6a–6d) for operating the hydraulic cylinder 30 that further includes a pair of fourth and fifth hoses 53, 54 connecting the hydraulic sequencing block 50 with the hydraulic cylinder 30. This secondary circuit is illustrated in the schematic illustrations of FIGS. 6a–6d (each different figure showing a different state or transition between states).

Figure 5:
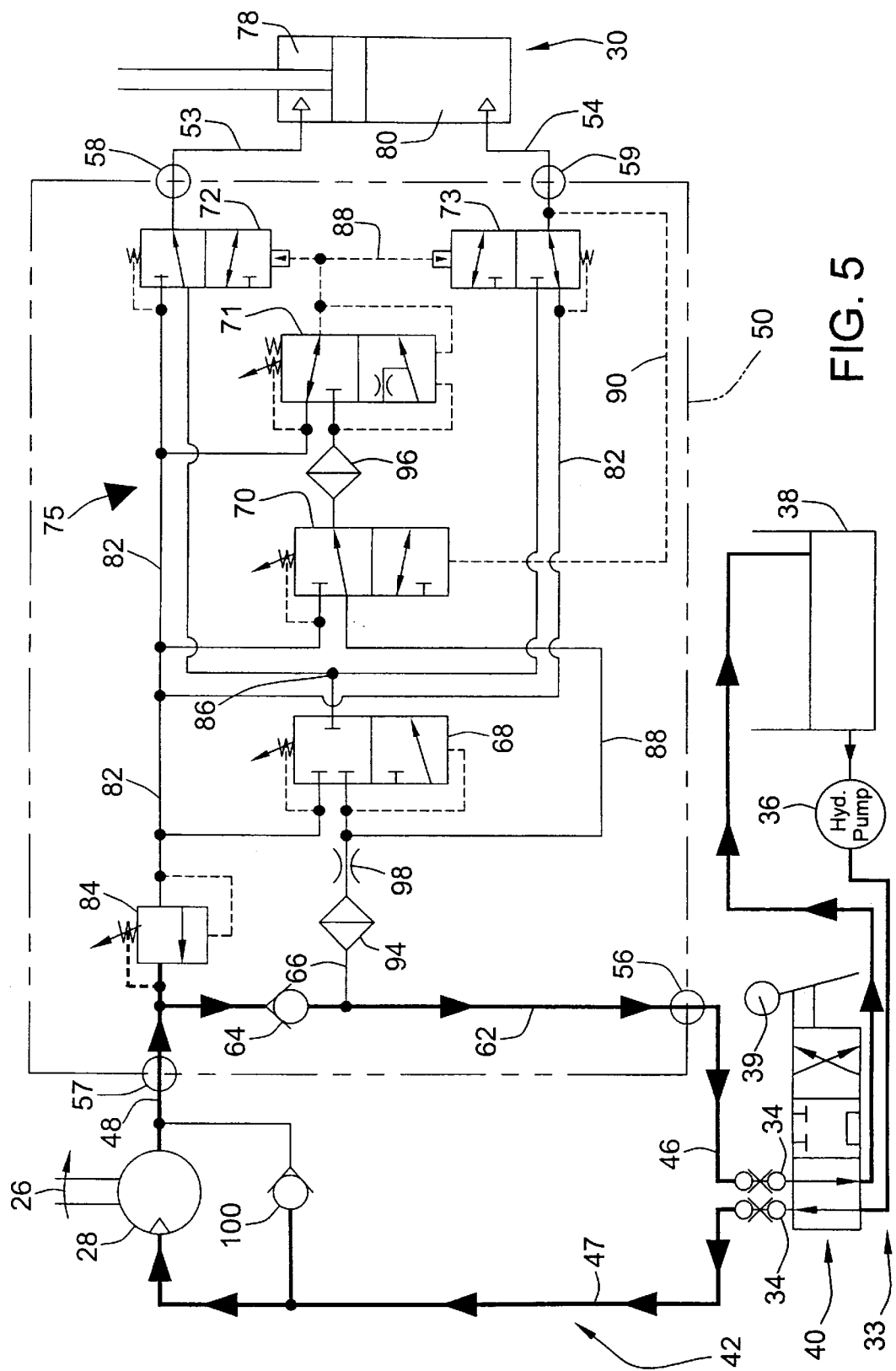
FIG. 5 is a schematic diagram of the hydraulic circuit shown in FIG. 4 shown in a first mode for driving the rotary broom.
Figure 6A:
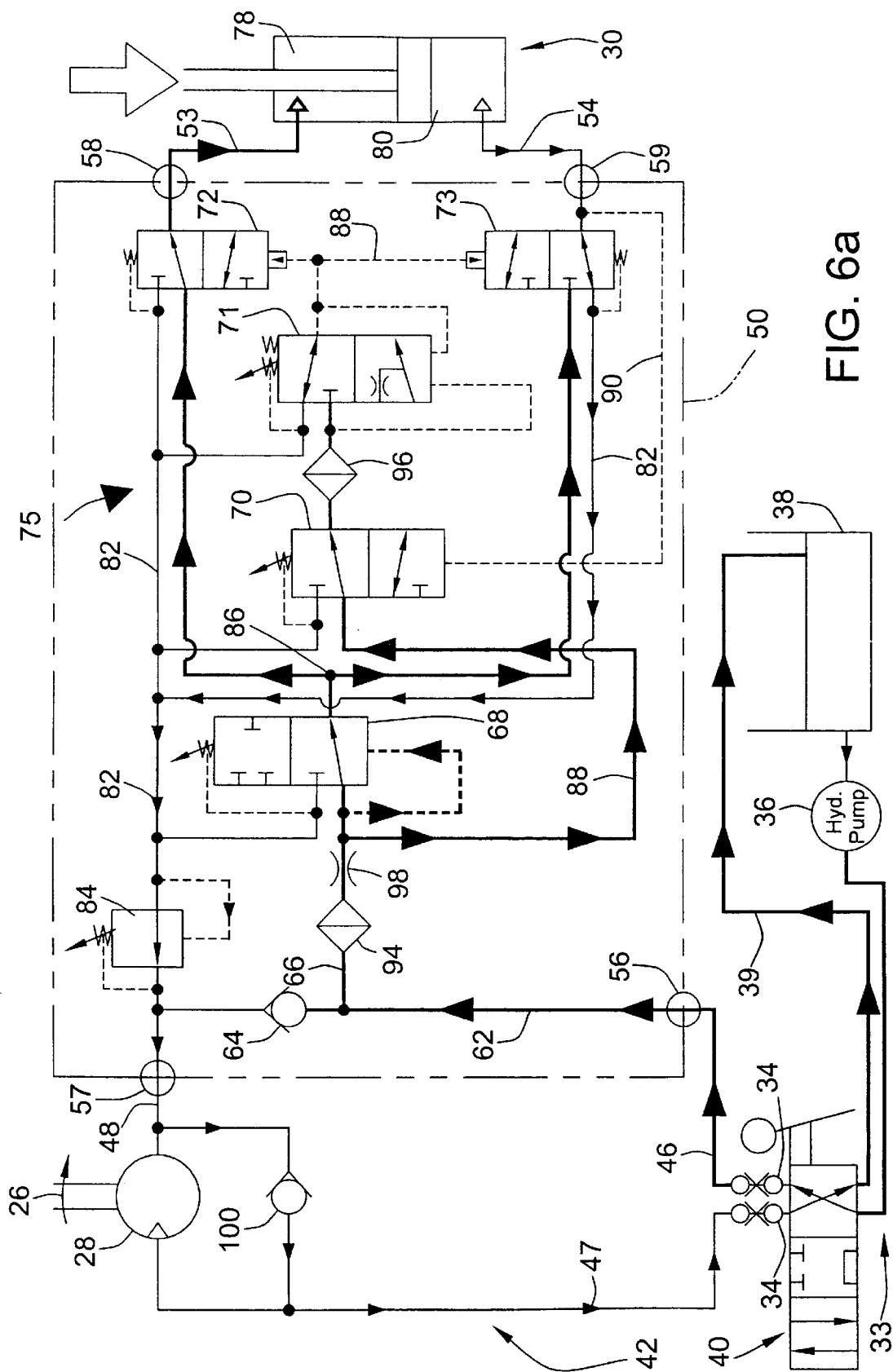
FIGS. 6a–6e are schematic diagrams of the hydraulic circuit shown in FIG. 4 shown in a second mode for reciprocating a hydraulic cylinder with various states shown in sequence.
Figure 6B:
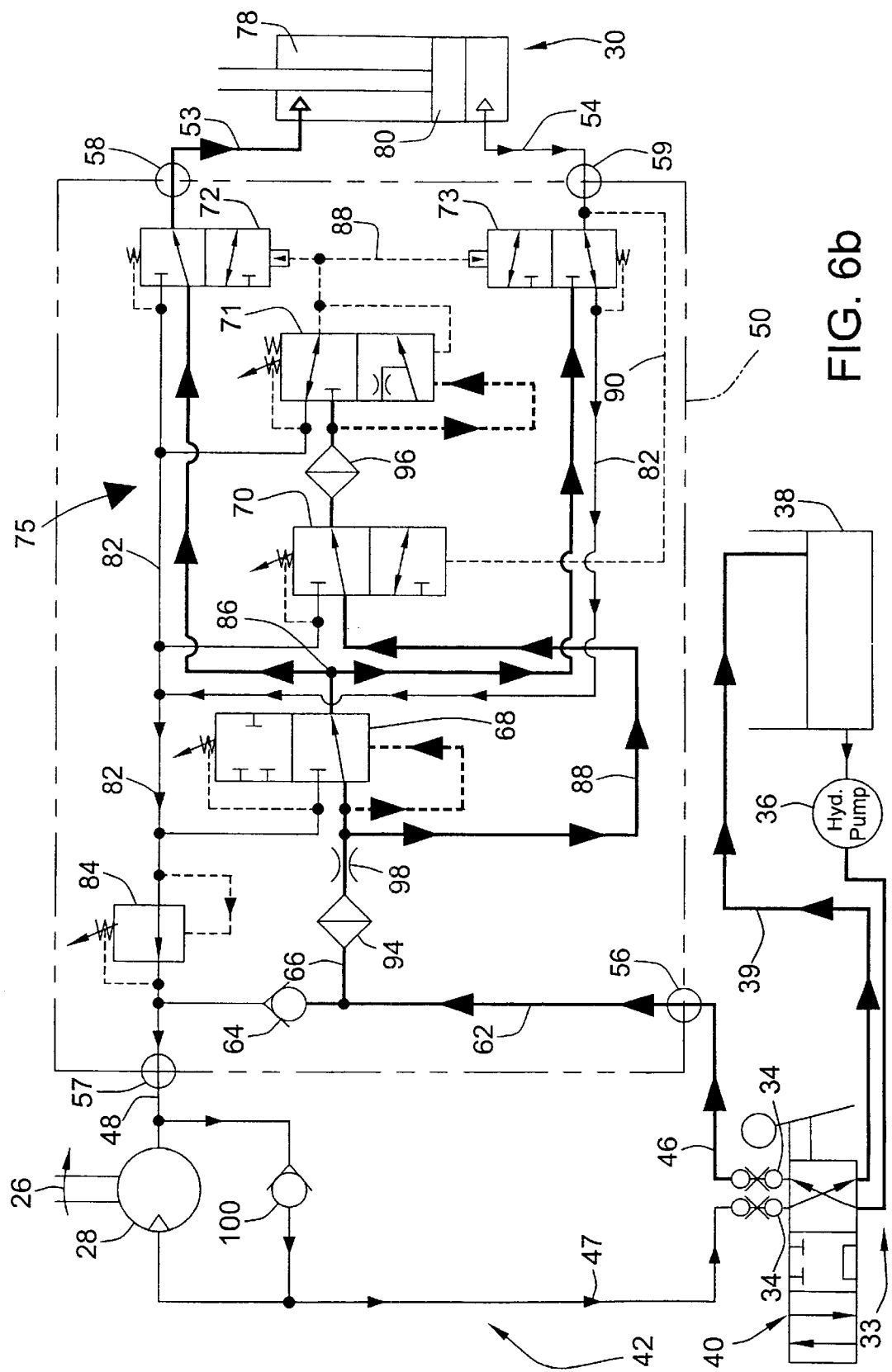
Figure 6C:
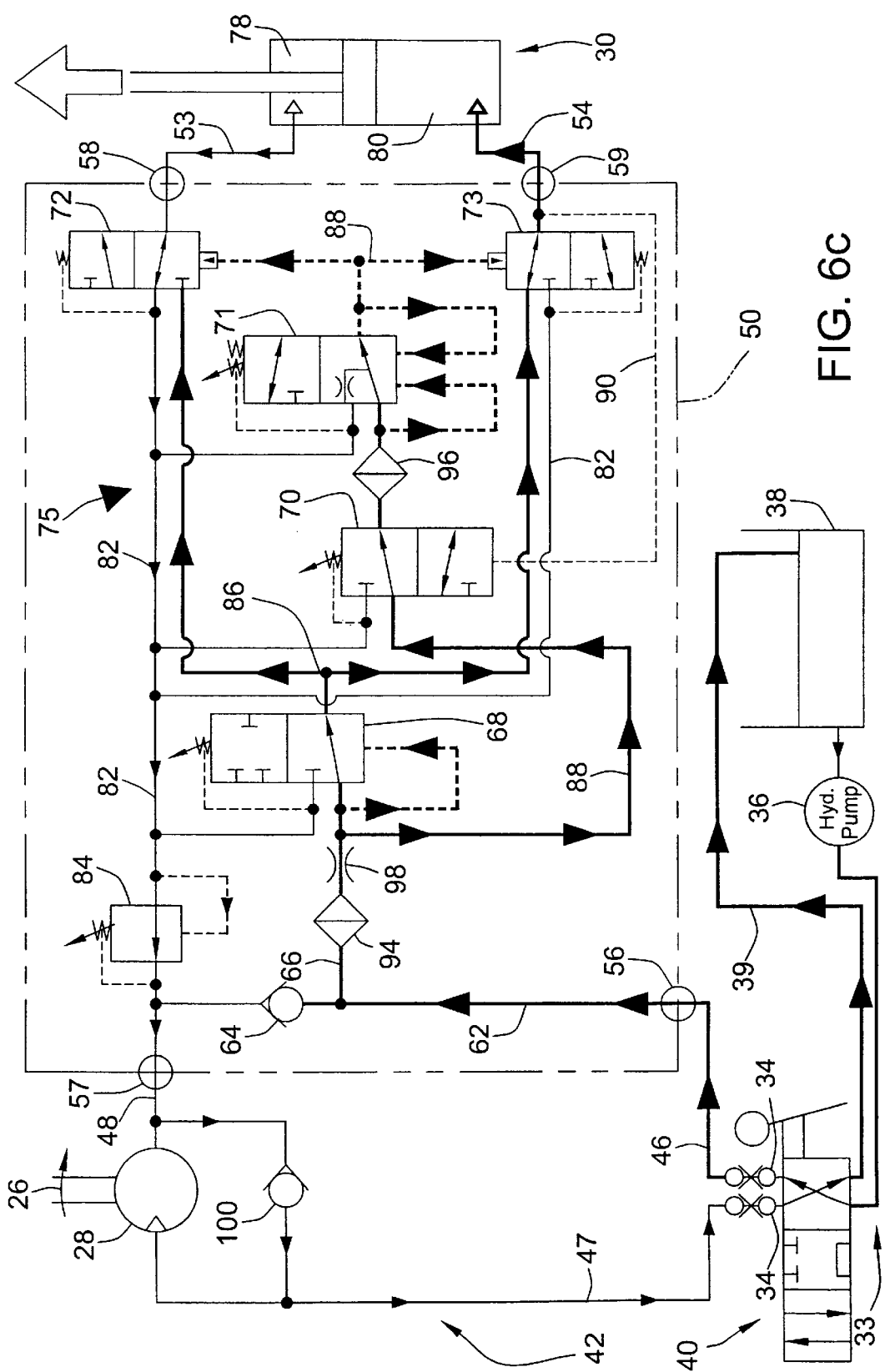
Figure 6D:
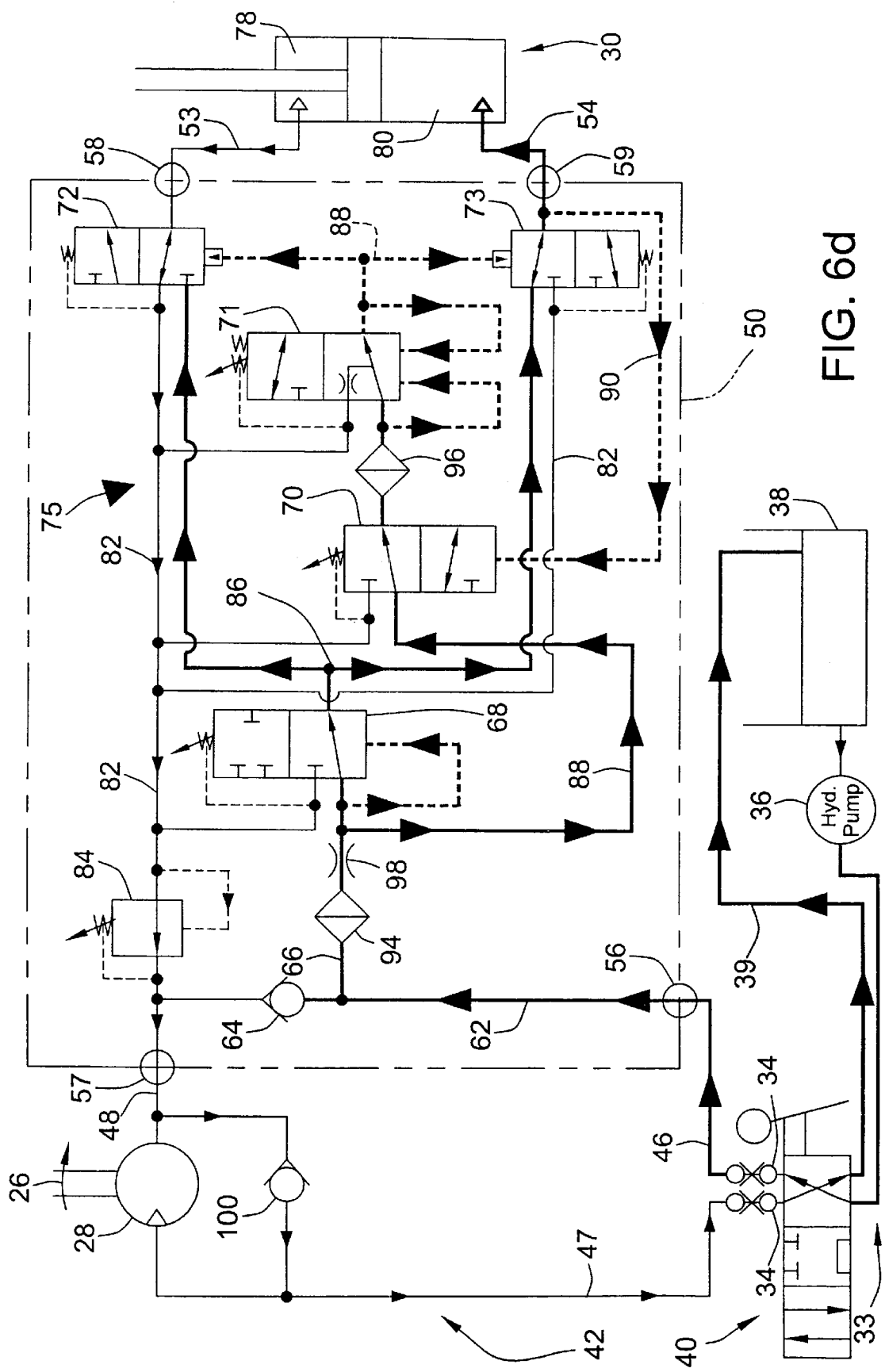
Figure 6E:
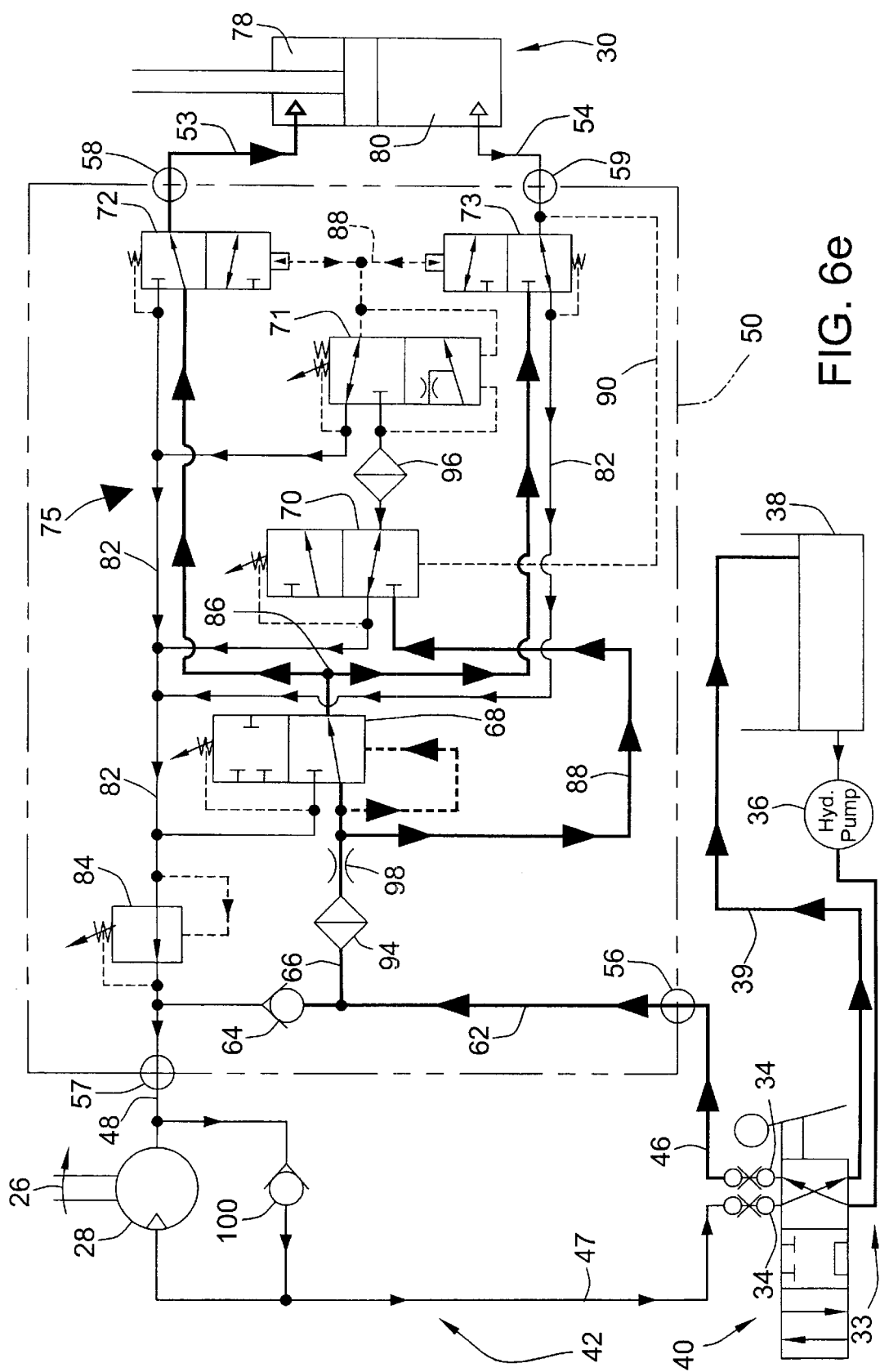
Figure 7:
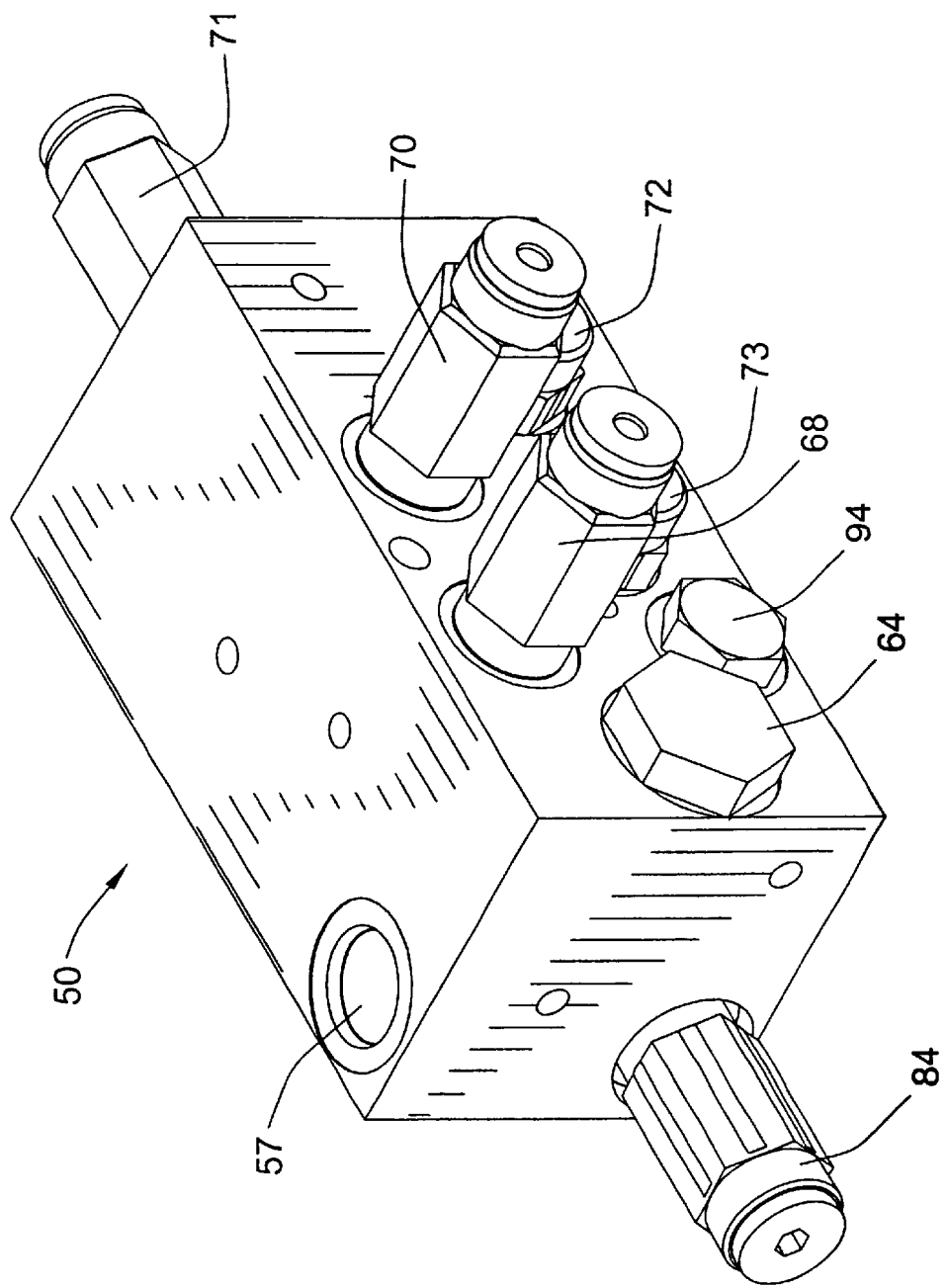
FIG. 7 is an isometric view of a hydraulic sequencing block used in an embodiment of the present invention.
Figure 8:
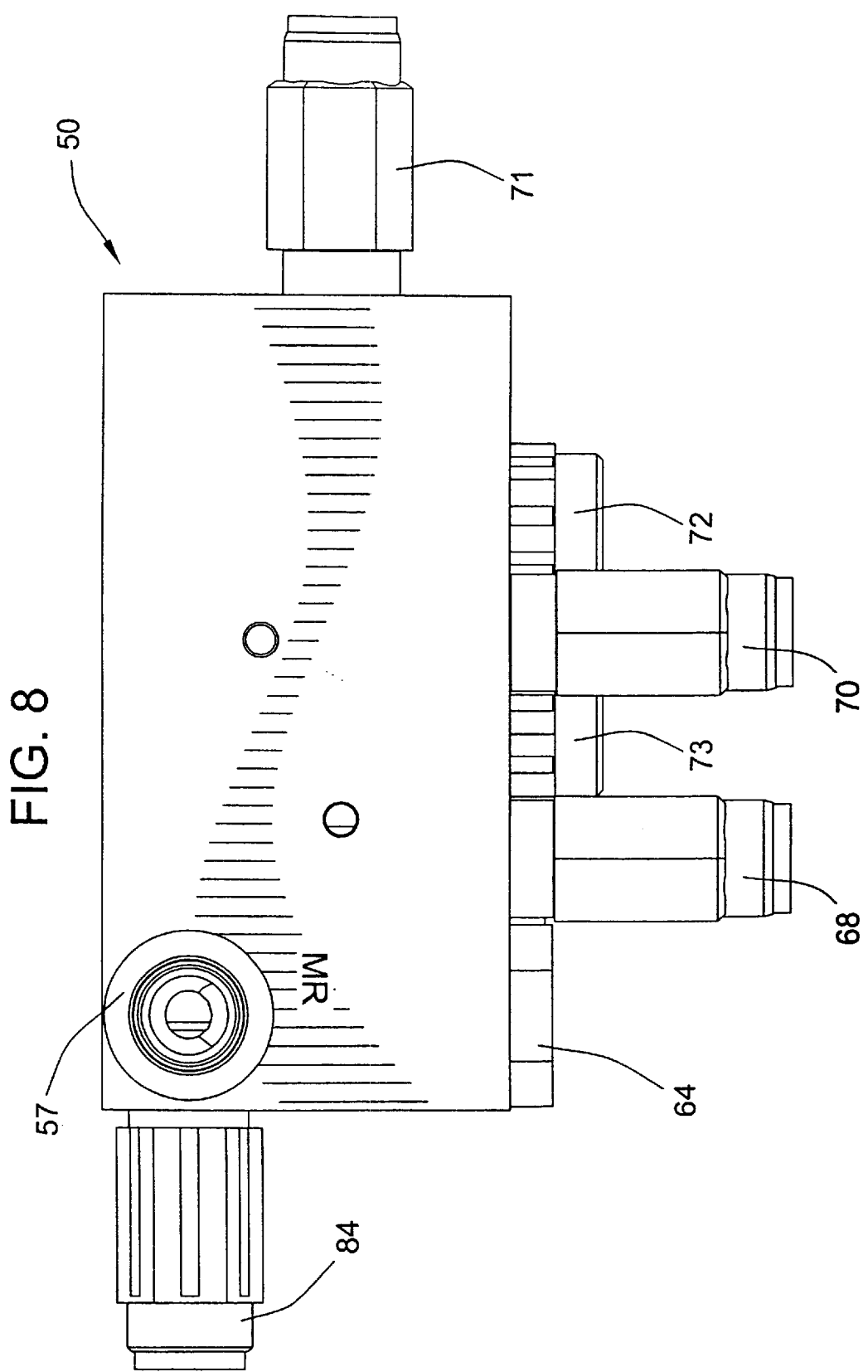
Figure 9:
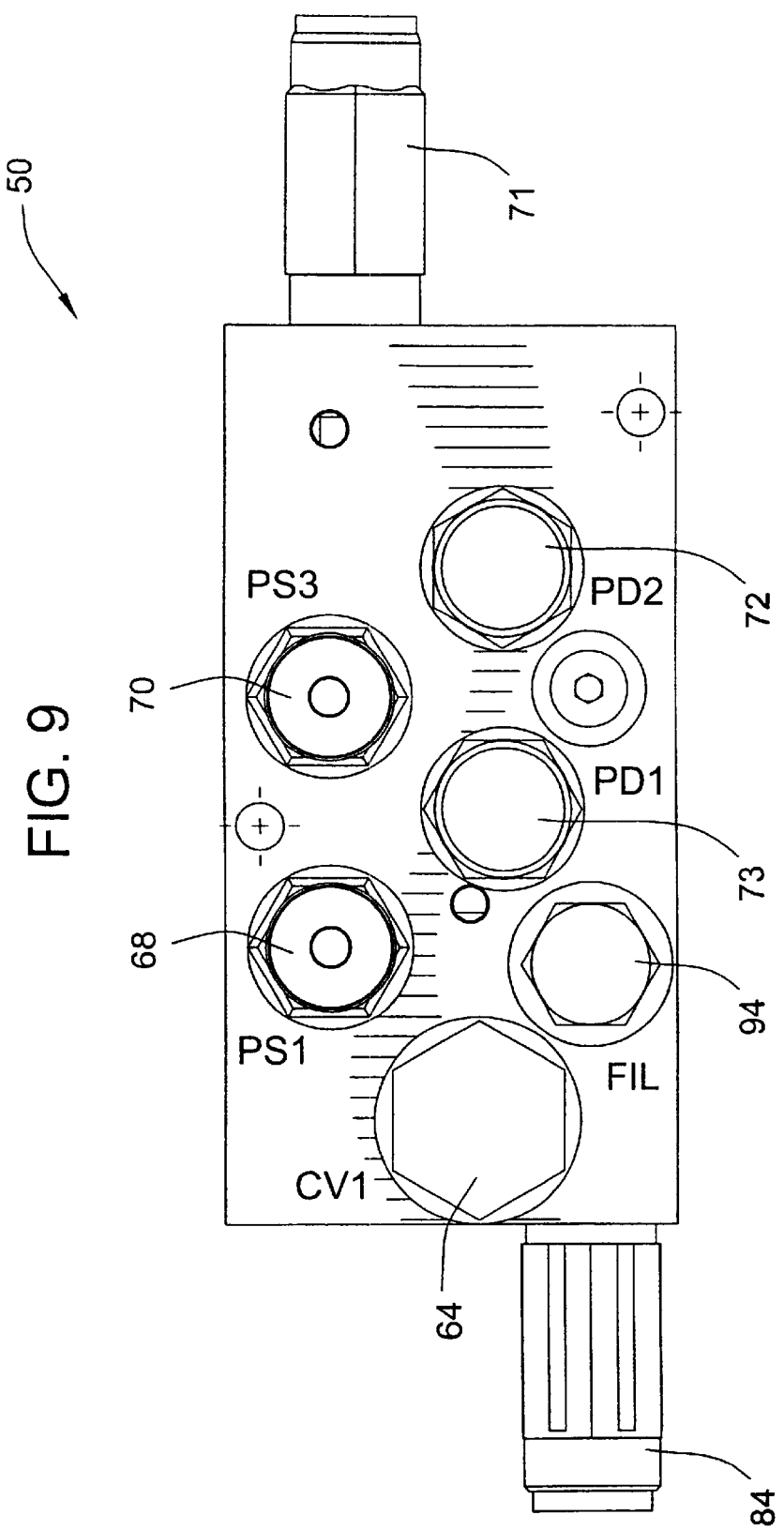
Figure 10:
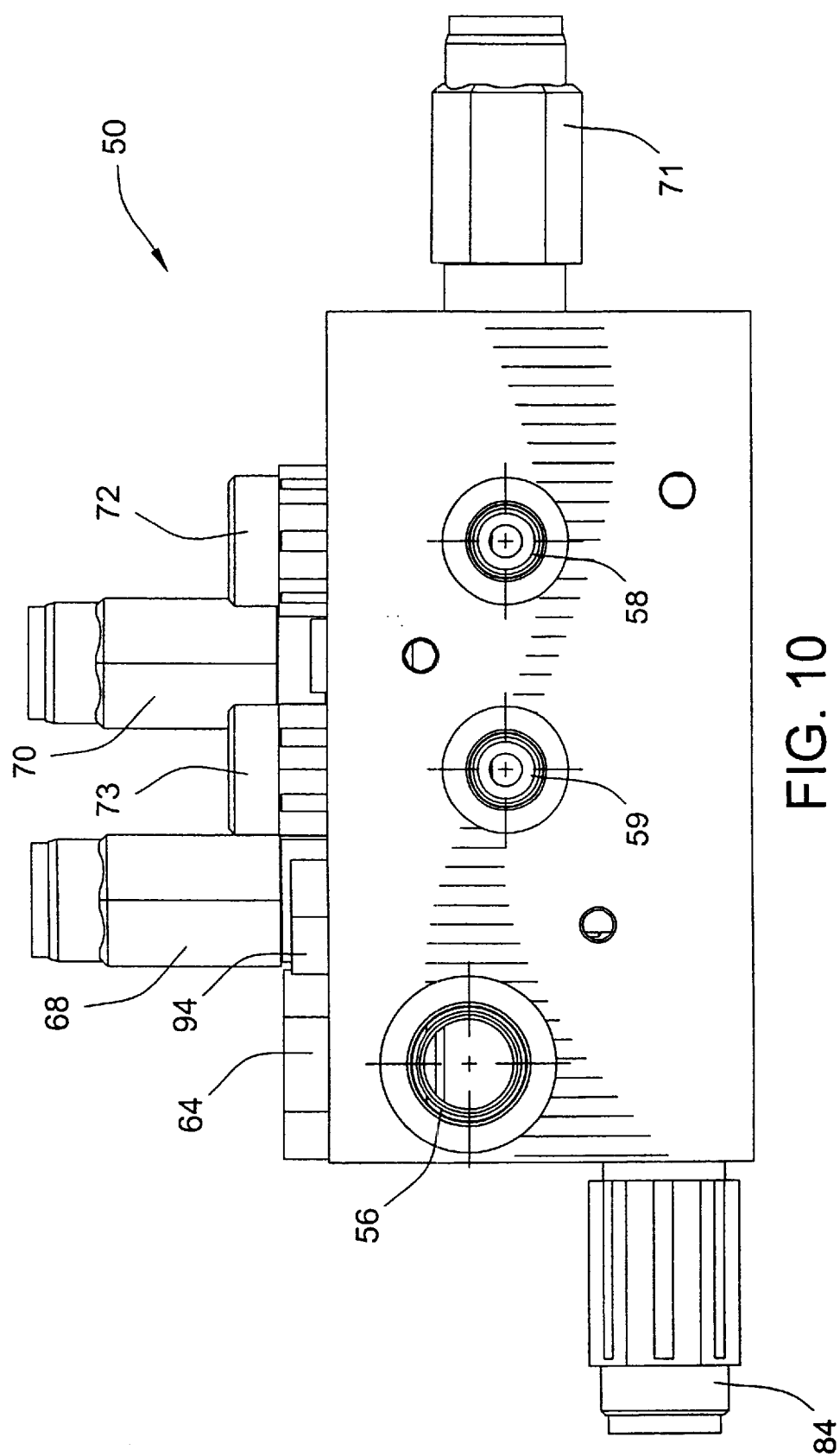

From the foregoing, it should be apparent that the hydraulic sequencing block 50 includes four different external ports 56–59. The first port 56 is connected directly to the skid steer's hydraulic system 33 via hose 46. The second port 57 is connected directly to the hydraulic rotary motor 28 via hose 48. The third and fourth ports 58, 59 are connected directly to the hydraulic cylinder 30 via hoses 53, 54. The internal plumbing of the hydraulic sequencing block includes a direct conduit 62 connecting the first two ports 56, 57. A check valve 64 is arranged in the direct conduit 62 to only allow one directional return flow from the hydraulic rotary motor 28 to flow along the direct conduit path en route to the sump 38 as shown in FIG. 5. When hydraulic flow is reversed, the check valve 64 closes thus blocking flow and in turn cause causes flow to pressurize and enter a bypass inlet conduit 66 which diverts flow through the secondary circuit, first through shut-off valve 68 and then through an array of four two-position valves 70–73, the combination of which provides a hydraulic switch generally indicated at 75. The hydraulic switch 75 is operable to reverse the direction hydraulic flow to the hydraulic cylinder 30. As shown in FIGS. 6a, 6b, the hydraulic switch 75 includes a first state in which pressurized working fluid is channeled to a first chamber 78 of the hydraulic cylinder 30 and the second chamber 80 is vented to the sump 38. This causes the piston of the hydraulic cylinder 30 to retract. As shown in FIGS. 6c, 6d, the hydraulic switch 75 includes a second state in which pressurized working fluid is channeled to a second chamber 80 of the hydraulic cylinder 30 and the first chamber 78 is vented to the sump 38. This causes the piston of the hydraulic cylinder 30 to expand. Vented hydraulic fluid from the hydraulic cylinder 30 is evacuated on vent line 82 en route to the second port 57 for return to the hydraulic sump 38. A pressure relief valve 84 (or check valve) is arranged along vent line 82 to ensure that flow does not reverse through vent line 82 and that the hydraulic cylinder 30 is vented only when desired.

It is a feature that the hydraulic switch 75 is responsive to hydraulic feedback from the hydraulic cylinder 30 as a result of the cylinder reaching the end of its expansion or retraction stroke. In particular, when the hydraulic cylinder 30 reaches the end of its stroke (either expansion or retraction), the pressure increases to the full working pressure from the skid steer's hydraulic system 33 which in turn is used to switch states of certain valves to reverse the direction of flow and cause the hydraulic cylinder 30 to reverse direction. With this configuration, the hydraulic cylinder 30 continuously reciprocates back and forth when the cab operator places the skid steer's control valve 40 in the reverse flow position shown in FIGS. 6a–6d. Once the control valve 40 is moved via the control lever 39 to either the over center position shown in FIG. 4 or the broom operation position shown in FIG. 5, the flow to the hydraulic cylinder 30 ceases and the hydraulic cylinder 30 and thus the pivoted/tilted position of the broom 26 is hydraulically locked into position.

Referring to the preferred construction of the hydraulic sequencing block 50 and the hydraulic switch 75, the third and fourth two-position valves 72, 73 of the hydraulic switch 75 function as control gates connecting the respective cylinder chambers 78, 80 to either the high pressure hydraulic working flow in working line 86 (connected to the high pressure hydraulic working flow through bypass shut-off valve 68) or to the low pressure vent line 82. The other two valves 70, 71 of the hydraulic switch 75 function as pilots adapted to control high pressure pilot flow through pilot line 88 to the gate valves 72, 73. The first pilot valve 70 is also responsive to hydraulic feedback from the hydraulic pressure between the hydraulic cylinder 30 and one of the gate valves 73 via pilot line 90.

Operation of how the switch works can be seen with reference to FIGS. 6a–6d. As shown in FIG. 6a when the cylinder 30 is retracting, hydraulic working flow is routed through the working line 86 and gate valve 72 to the hydraulic cylinder 30 causing it to retract. The other gate valve 73 vents the hydraulic fluid from the cylinder 30 through the vent line 82. The second pilot valve 71 which is piloted by pressure in the pilot line 88 remains closed as the pressure is reduced sufficiently in the pilot line 88 to maintain the closed position due to the active outflow of the hydraulic working flow to the cylinder 30.

However, once the hydraulic cylinder 30 reaches the end of its retracting stroke, the hydraulic working flow stops, thus increasing the pressure in pilot line 88 as can be seen in viewing FIGS. 6b, 6c, which in turn switches the state of the second pilot valve 71 allowing flow through the pilot line 88 to simultaneously switch the states of both gate valves 72, 73. This reverse the direction of hydraulic flow causing the hydraulic working flow to now work the hydraulic cylinder 30 through the other gate valve 73 causing the cylinder to expand as shown in FIG. 6c. The other gate valve 72 now allows hydraulic fluid from the hydraulic cylinder 30 to vent through the vent line 82. It should be noted that valve 72 is a direct acting, spool-type, hydraulic sequence valve with internal pilot and spring chamber drain, designed to direct flow to a second circuit once a first predetermined pressure is attained in the first circuit. The valve 72 will remain shifted until the pressure in the second circuit falls below a second lower predetermined pressure set by a second spring.

Now, once the hydraulic cylinder 30 fully expands and reaches the end of its expanding stroke, pressure builds up in feedback line 90 causing the first pilot valve 70 to shift allowing the second pilot valve 71 to vent the pilot lines from the two gate valves 72, 73 to the vent line 82, which in turn causes the gate valves to simultaneously switch states again back to the state shown n FIG. 6a.

Assuming a commercial work vehicle that has a hydraulic system pressure of between about 2000–3500 PSI, the following valves in the sequencing block 50 may be actuated and shifted at the following pilot pressures:

| Valve | Actuating Pressure |
|---|---|
| Shut off valve 68 | 450 PSI |
| Pressure Relief Valve 84 | 400 PSI |
| 1st Pilot Valve 70 | 1400 PSI |
| 2nd Pilot Valve 71 | 1800 PSI (in one direction) and 450 PSI (in opposite direction) |

Referring to other hydraulic structures for the sake of completeness, the hydraulic sequencing block 50 also includes screens/filters 94, 96 at selected locations to prevent plugging of the hydraulic sequencing block 50 and a restriction 98 to control flow rate to the hydraulic cylinder 30.

A further feature of the present invention is a second check valve 100 arranged in parallel circuit with the broom's hydraulic rotary motor 28 that has a closed position during flow through the primary circuit shown in FIG. 5 when hydraulic flow powers the motor and drives the broom. The check valve opens when flow is reversed venting returning flow from the hydraulic sequencing block 50 when the hydraulic cylinder 30 is being driven as shown in FIGS. 6a–6d. The second check valve 100 serves the purpose of preventing shock loads from being induced on the hydraulic rotary motor 28 when the hydraulic flow is reversed. This allows the rotary broom 26 to free wheel and naturally come to a stop and prevents hydraulic flow from reversing through the motor 28.

Figure 4:
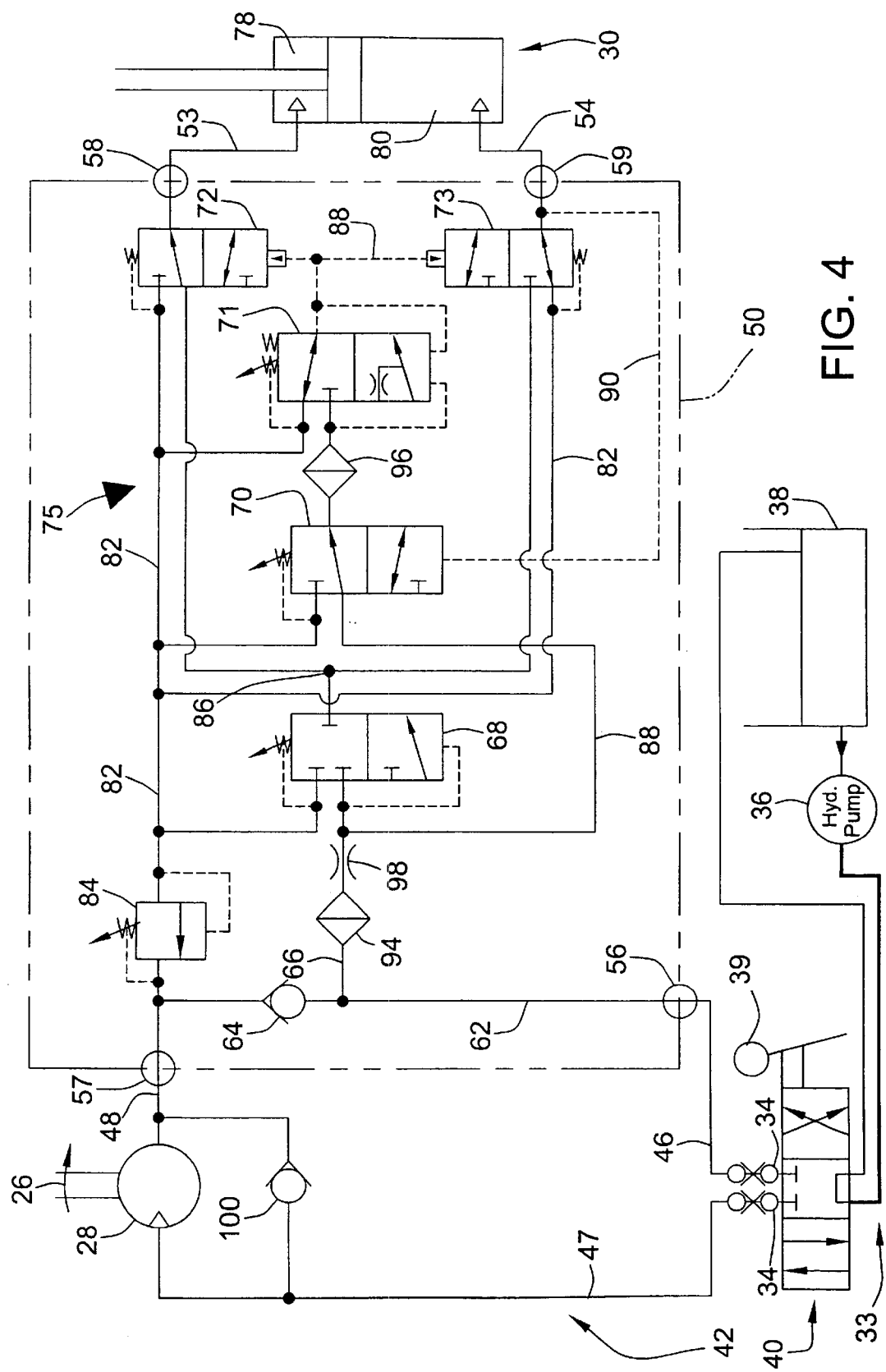
FIG. 4 is a schematic diagram of a hydraulic circuit in a static state according to an embodiment of the present invention.

In normal operation as shown in FIG. 5, hydraulic working output of the skid steer's hydraulic system 33 is directed to the hydraulic rotary motor 28 which rotates the broom 26 for sweeping operation. The operator in the cab 16 may turn the broom 26 off by positioning the control valve 40 in the blocked over center position as shown in FIG. 4. When it is desired to tilt or pivot the rotary broom 26 left or right, the operator of the cab reverses the hydraulic flow which causes the hydraulic cylinder 30 to continuously reciprocate back and forth until the operator shuts off flow through this secondary circuit.

All the illustrated embodiment takes the form of a rotary broom attachment 20, it will be appreciated that the present invention is applicable to and covers other embodiments. In particular, the present invention may be incorporated in a snowblower attachment (functions of engaging/blowing snow and direction the snow or the attachment), a cold planner attachment, a rock saw attachment, a stump grinder attachment, a rotary landscape rake, and other similar attachments where control over two hydraulic functions is desirable or necessary. Other embodiments may attach to the rear end of the vehicle (eg. via a three point hitch) or may be part of the hydraulic system of the commercial work vehicle or other hydraulic system of other work apparatus.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An attachment for selective attachment to and detachment from a work vehicle, the work vehicle having a hydraulic pump for generating a working output and a hydraulic sump, the working output controlled by the operator of the work vehicle to selectively provide two different hydraulic signals, comprising:

a mounting structure adapted to attach and detach the attachment to the work vehicle;

a first hydraulic actuator performing a first work operation;

a second hydraulic actuator performing a second work operation;

a hydraulic circuit for connecting the working output with the first and second hydraulic actuators, the hydraulic circuit including a primary circuit directing the working output to the first hydraulic actuator and a secondary circuit directing the working output to the second hydraulic actuator, further comprising a diversion valve diverting working output through the secondary circuit in response to one of the hydraulic signals.

2. The attachment of claim 1 wherein the first hydraulic actuator is a rotary hydraulic motor hydraulic and the second hydraulic actuator is a hydraulic cylinder having a linear reciprocating movement, wherein the circuit further comprises:

first and second hydraulic couplings adapted to connect to corresponding hydraulic couplings of the work vehicle for transmitting the working output, the first hydraulic coupling hydraulically connected to the a rotary hydraulic motor;

a hydraulic sequencing block incorporating said diversion valve having a first port hydraulically connected to the second hydraulic coupling, a second port hydraulically connected to the rotary motor, and a hydraulic switch interposed between said diversion valve and the hydraulic cylinder, the hydraulic switch adapted to reverse the hydraulic flow to the hydraulic cylinder to cause the linear reciprocating movement, the hydraulic switch adapted to switch direction of hydraulic flow to the hydraulic cylinder in response to pressure feedback from the hydraulic cylinder as a result of the hydraulic cylinder reaching ends of the linear reciprocating movement.

3. The attachment of claim 2 wherein the diversion valve is a check valve.

4. The attachment of claim 3 wherein hydraulic fluid from the hydraulic cylinder is adapted to be vented out through the second port.

5. The attachment of claim 4 further comprising a second check valve in parallel circuit with the hydraulic rotary motor allowing return flow through the secondary circuit to bypass the hydraulic rotary motor.

6. The attachment of claim 4 further comprising a shut-off valve arranged between the hydraulic cylinder and the second port, piloted by pressure between the shut-off valve and the hydraulic cylinder and biased toward a closed position, the shut-off valve cracking open at a predetermined pressure.

7. An attachment for selective attachment to and detachment from a work vehicle, the work vehicle having a pair of hydraulic couplings for hydraulic coupling to the attachment, a hydraulic pump for generating a working output and a hydraulic sump, the working output controlled by the operator of the work vehicle to selectively provide two different hydraulic signals including hydraulic flow in opposing directions through the hoses, comprising:
- a mounting structure adapted to attach and detach the attachment to the work vehicle;
- a support frame movable relative to the mounting structure, the support frame carrying a rotary work device;
- a first hydraulic actuator adapted to drive the rotary work device;
- a second hydraulic actuator adapted to position the support frame relative to the mounting structure;
- a hydraulic circuit including a pair of hydraulic couplings adapted to connect to the pair of hydraulic couplings of the work vehicle, the hydraulic circuit including a first valve responsive to the two hydraulic signals having a first state in response to one of the hydraulic signals wherein hydraulic flow is adapted to operate the first hydraulic actuator and a second state in response to the other of the hydraulic signals wherein hydraulic flow is adapted to operate the second hydraulic actuator.

8. The attachment of claim 7 wherein the first valve is a first check valve arranged in series with the first hydraulic actuator, the first check valve having a closed position forcing hydraulic flow to flow to the second hydraulic actuator.

9. The attachment of claim 8 wherein the first hydraulic actuator is a rotary motor, further comprising a second check valve in parallel circuit with the rotary motor adapted to vent hydraulic flow from the second hydraulic actuator past the first hydraulic actuator.

10. The attachment of claim 8 wherein the second hydraulic actuator is a hydraulic cylinder having a linear reciprocating movement, the hydraulic circuit including a hydraulic switch interposed between said first check valve and the hydraulic cylinder adapted to switch the hydraulic flow to the hydraulic cylinder to cause the linear reciprocating movement to switch directions in response to an increased pressure feedback from the hydraulic cylinder as a result of the hydraulic cylinder reaching ends of the linear reciprocating movement.

11. The attachment of claim 8 further comprising a shut-off valve arranged in series with the hydraulic switch, the shut-off valve biased toward a closed position being piloted by hydraulic pressure when the first check valve is closed.

12. The attachment of claim 7 wherein the rotary work device is one selected from the group consisting of a rotary broom, a cold planer, a rock saw, a stump grinder, a rotary landscape rake and a snowblower.

13. In an attachment for selective attachment to and detachment from a work vehicle, the work vehicle having a pair of first and second hydraulic couplings for hydraulically coupling the work vehicle to the attachment, a hydraulic pump for generating a working output and a hydraulic sump, the working output controlled by the operator of the work vehicle to selectively provide two different hydraulic signals including hydraulic flow in opposing directions through the hydraulic couplings, the attachment including a mounting structure adapted to attach and detach to the work vehicle; a support frame movable relative to the mounting structure, a rotary work device carried by the support frame; a rotary motor adapted to drive the rotary work device; a hydraulic cylinder having linear reciprocating movement adapted to position the support frame relative to the mounting structure, a hydraulic circuit comprising:
- a first hydraulic hose adapted to hydraulically connect to the first hydraulic coupling;
- a second hydraulic hose hydraulically connected to the rotary motor adapted to connect to the second hydraulic coupling;
- a hydraulic sequencing block comprising:
  - (a) a first port hydraulically connected with the first hydraulic hose;
  - (b) a second port hydraulically connected with the rotary motor;
  - (c) a pair of third and fourth ports hydraulically connected to the hydraulic cylinder for reciprocating the hydraulic cylinder;
  - (d) a diversion valve arranged between the first and second ports adapted to divert hydraulic working flow through a bypass conduit to one of the third and fourth ports for operating the hydraulic cylinder;
  - (e) a hydraulic switch arranged in the bypass conduit adapted to switch the working flow between the third and fourth ports, the hydraulic switch adapted to be responsive to increased hydraulic pressure in the working output as a result of the hydraulic cylinder reaching ends of its linear reciprocating movement;
  - (f) a vent conduit venting to the second port, routed through the switch to one of the third and fourth ports for venting flow from the hydraulic cylinder out through the second port.

14. The hydraulic circuit of claim 13 further comprising a check valve arranged in parallel circuit with the rotary motor allowing vented flow from the hydraulic cylinder and through the second port to be bypassed the rotary motor.

15. The hydraulic circuit of claim 13 wherein the diversion valve is a check valve.

16. The hydraulic circuit of claim 14 further comprising a shutoff valve arranged in series with the hydraulic switch, the shutoff valve piloted by pressure of the working output flow when the check valve is closed to allow flow through the bypass conduit.

17. The hydraulic circuit of claim 13 wherein the hydraulic switch comprises:
- first and second gate valves interposed between the working output flow in the bypass conduit and the hydraulic cylinder, each gate valve controlling hydraulic flow to a respective chamber of the hydraulic cylinder, each gate valve having a first state in which the working output flow is directed to the respective chamber of cylinder and a second state in which the chamber of the hydraulic cylinder is vented;
- means responsive to pressure in the hydraulic sequencing block for switching the state of the gate valves simultaneously.

18. The hydraulic circuit of claim 17 wherein the switching means comprises first and second pilot valves in series, the first pilot valve piloted by pressure in one of the respective chambers of the hydraulic cylinder to switch flow through the second pilot valve from the working output flow in the bypass conduit to the vent flow in the vent conduit, the second pilot valve being piloted by hydraulic pressure of the other of the respective chambers of the hydraulic cylinder.

19. A hydraulic system of the work apparatus having a hydraulic pump for generating a working output and a hydraulic sump, the working output controlled by the operator of the work apparatus to selectively provide two different hydraulic signals, comprising:
- a first hydraulic actuator performing a first work operation;

a second hydraulic actuator performing a second work operation;

a hydraulic circuit connecting the working output with the first and second hydraulic actuators, the hydraulic circuit including a primary circuit directing the working output to the first hydraulic actuator and a secondary circuit directing the working output to the second hydraulic actuator, further comprising a diversion valve diverting working output through the secondary circuit in response to one of the hydraulic signals.

20. The hydraulic system of claim 19 wherein the first hydraulic actuator is a rotary hydraulic motor and the second hydraulic actuator is a hydraulic cylinder having a linear reciprocating movement, wherein the circuit further comprises a hydraulic sequencing block incorporating said diversion valve, the hydraulic sequencing block hydraulically connected to the rotary motor and the hydraulic cylinder, having a hydraulic switch interposed between said diversion valve and the hydraulic cylinder, the hydraulic switch adapted to reverse the hydraulic flow to the hydraulic cylinder to cause the linear reciprocating movement, the hydraulic switch adapted to switch direction of hydraulic flow to the hydraulic cylinder in response to pressure feedback from the hydraulic cylinder as a result of the hydraulic cylinder reaching ends of the linear reciprocating movement.

21. The hydraulic system of claim 20 wherein the diversion valve is a check valve.

22. The hydraulic system of claim 21 wherein hydraulic fluid from the hydraulic cylinder is adapted to be vented toward the rotary hydraulic motor and further comprising a second check valve in parallel circuit with the hydraulic rotary motor allowing return flow through the secondary circuit to bypass the hydraulic rotary motor.

23. The hydraulic system of claim 22 further comprising a shut-off valve arranged between the hydraulic cylinder and the second check valve, piloted by pressure between the shut-off valve and the hydraulic cylinder and biased toward a closed position, the shut-off valve cracking open at a predetermined pressure.

24. The hydraulic system of claim 19 wherein the hydraulic system is incorporated in an attachment for attachment and detachment from a commercial work vehicle.

\* \* \* \* \*